(12) United States Patent
Koyama et al.

(10) Patent No.: US 7,503,505 B2
(45) Date of Patent: Mar. 17, 2009

(54) NON-CONTACT IC CARD SYSTEM AND ATTACHING BODY FOR NON-CONTACT IC CARD

(75) Inventors: Toshimi Koyama, Tokyo (JP); Nobuyuki Nonaka, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 71 days.

(21) Appl. No.: 11/403,155

(22) Filed: Apr. 13, 2006

(65) Prior Publication Data

US 2006/0243811 A1    Nov. 2, 2006

(30) Foreign Application Priority Data

Apr. 19, 2005  (JP) ............................. 2005-120553

(51) Int. Cl.
*G06K 19/06*   (2006.01)
(52) U.S. Cl. ........................ 235/492; 235/451; 235/486; 235/492
(58) Field of Classification Search .................. 235/492, 235/472.01, 472.02, 451, 486
See application file for complete search history.

(56) References Cited

U.S. PATENT DOCUMENTS

| 6,204,764 | B1 * | 3/2001 | Maloney ................... 340/568.1 |
| 7,163,155 | B2 * | 1/2007 | Briancon et al. ............ 235/492 |
| 2004/0185901 | A1 * | 9/2004 | Kachi et al. .............. 455/556.1 |
| 2005/0006484 | A1 * | 1/2005 | Ito ............................. 235/492 |

FOREIGN PATENT DOCUMENTS

JP       2004-295297       10/2004

* cited by examiner

*Primary Examiner*—Thien M. Le
*Assistant Examiner*—Tuyen K Vo
(74) *Attorney, Agent, or Firm*—Leydig, Voit & Mayer, Ltd.

(57) ABSTRACT

A non-contact IC card can accept a frequency band different from the main receive frequency band of the non-contact IC card. The non-contact IC card has a main antenna supporting a first frequency band and an IC device connected to the main antenna for data transmission and reception. An attaching body, detachably attached to the non-contact IC card has a sub-antenna supporting a second frequency band different from the first frequency band. When the attaching body is attached to the non-contact IC card, the sub-antenna is capacitively coupled to the main antenna.

3 Claims, 8 Drawing Sheets (A)

(B)

NON-CONTACT IC CARD SYSTEM AND ATTACHING BODY FOR NON-CONTACT IC CARD

The present disclosure relates to subject matters contained in Japanese Patent Application No. 2005-120553 filed on Apr. 19, 2005, which are expressly incorporated herein by reference in its entireties.

BACKGROUND OF THE INVENTION

1. Field of the Invention

The present invention relates to a non-contact IC card system and an attaching body for the non-contact IC card and, more particularly, to a non-contact IC card system adaptable to a plurality of frequency bands by using an attaching body and an attaching body for the non-contact IC card.

2. Description of the Prior Art

In recent years, there have been prevalent so-called non-contact IC cards which can send and receive data to and from a device within the card using electromagnetic waves. Such a non-contact IC card communicates data with a reader using electromagnetic waves of a predetermined frequency band.

The frequency band of electromagnetic waves to be used depends on the communication system used by the non-contact IC card. Not all cards use electromagnetic waves of a common frequency band. Also, the non-contact IC card standards in countries are not necessarily the same. Since frequencies to be used differ by country, a non-contact IC card available in one country may be unavailable in another country.

For this reason, there is proposed a non-contact IC card (wireless IC tag) adaptable to a plurality of frequency bands (e.g., Japanese Patent Laid-Open No. 2004-295297).

SUMMARY OF THE INVENTION

However, the above-described non-contact IC card (wireless IC tag) adaptable to a plurality of frequency bands needs to have, in advance, a special antenna incorporated therein. The non-contact IC card cannot implement the use of an existing non-contact IC card which can accept only a single frequency band, in a plurality of frequency bands.

The present invention has as its object to provide a technique for allowing a non-contact IC card to accept a frequency band different from the main receive frequency band of the non-contact IC card.

As means for solving the above-described problem, the present invention has the following features.

According to a first aspect of the present invention, there is provided a non-contact IC card system having a non-contact IC card which has a first antenna (e.g., a main antenna) supporting a first frequency band and circuit means (e.g., an IC device) connected to the first antenna for performing data transmission and reception processing and an attaching body detachably attached to the non-contact IC card which has a second antenna supporting a second frequency band different from the first frequency band, wherein the second antenna can be capacitively coupled to the first antenna when the attaching body is attached to the non-contact IC card.

The system allows the non-contact IC card to accept even a frequency band different from the first frequency band, which is a main receive frequency band of the non-contact IC card by attaching the attaching body to the non-contact IC card. The system also implements connection between the non-contact IC card and the attaching body without providing any electrical component such as a terminal or interface that electrically connects the non-contact IC card and attaching body.

In the system, each of the first antenna and second antenna may be a plate-like conductor. When the attaching body is attached to the non-contact IC card, the first antenna and second antenna may be arranged such that the first antenna and second antenna at least partially oppose each other.

The attaching body may be a case which can store the non-contact IC card or a plate which can be stuck on the non-contact IC card.

According to a second aspect of the present invention, there is provided an attaching body for a non-contact IC card detachably attached to a non-contact IC card which has a first antenna (e.g., a main antenna) supporting a first frequency band and circuit means (e.g., an IC device) connected to the first antenna for performing data transmission and reception processing, wherein the attaching body has a second antenna (e.g., a sub-antenna) supporting a second frequency band different from the first frequency band, and the second antenna can be capacitively coupled to the first antenna when the attaching body is attached to the non-contact IC card.

The attaching body allows the non-contact IC card to receive electromagnetic waves from a reader which uses a frequency band different from the first frequency band, which is a main receive frequency band of the non-contact IC card.

In the attaching body, each of the first antenna and second antenna may be a plate-like conductor. When the attaching body is attached to the non-contact IC card, the first antenna and second antenna may be arranged such that the first antenna and second antenna at least partially oppose each other.

The attaching body may be a case which can store the non-contact IC card or a plate which can be stuck on the non-contact IC card.

The accompanying drawings, which are incorporated in and constitute apart of the specification, illustrate embodiments of the invention, and together with the general description given above and the detailed description of the embodiments given below, serve to explain the principles of the invention.

DESCRIPTION OF THE PREFERRED EMBODIMENTS

An embodiment according to the present invention will be explained in detail below with reference to the accompanying drawings.

An embodiment of the present invention will be explained below with reference to the drawings.

The embodiment of the present invention is a non-contact IC card system which is composed of a non-contact IC card (to be simply referred to as a "card" hereinafter) and an attaching body detachably attached to the card.

[1. Configuration Example of Non-Contact IC Card]

Figure 1:
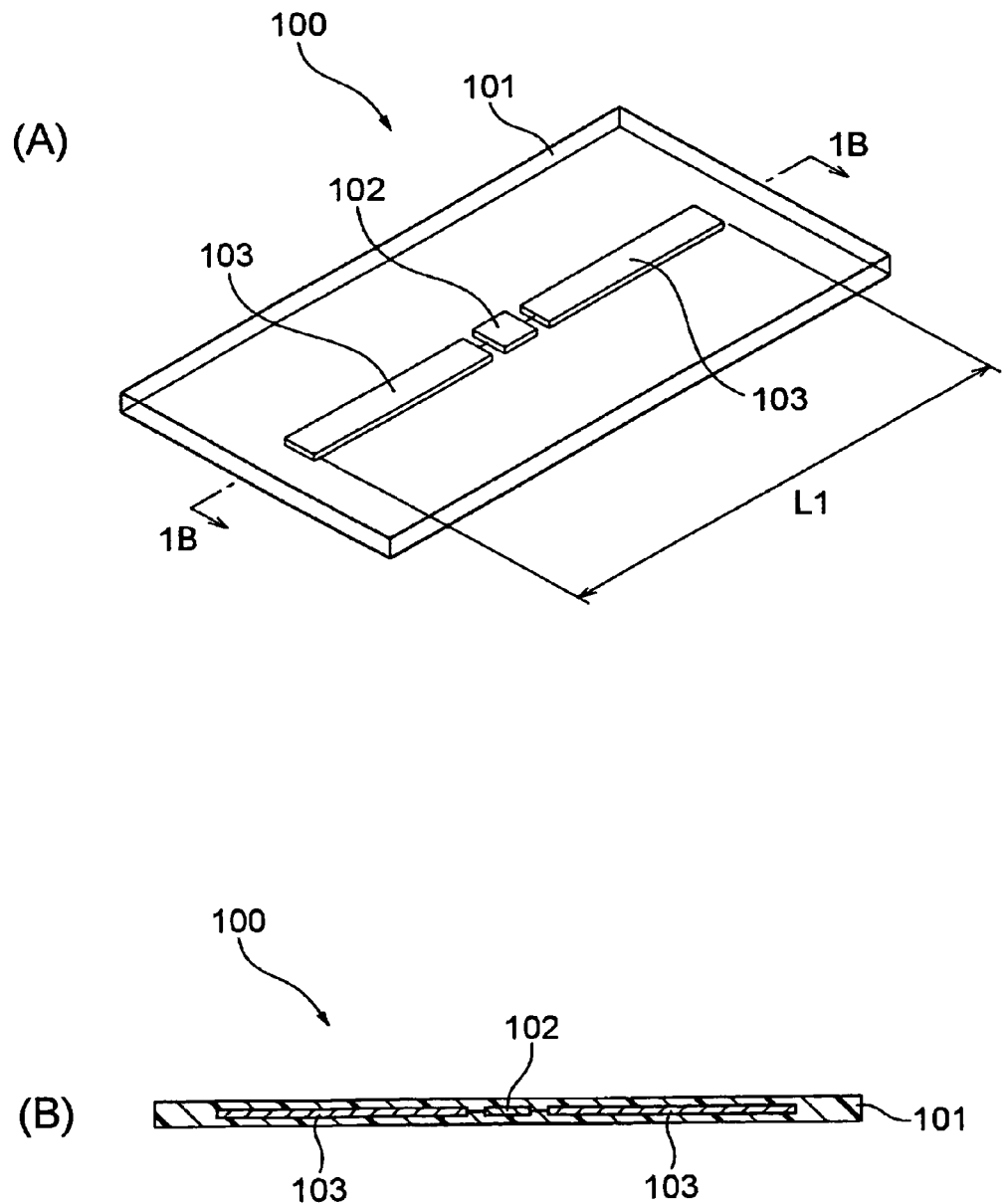
FIG. 1A is a transparent perspective view of a non-contact IC card.
FIG. 1B is a sectional view taken along the line 1B-1B in FIG. 1A.

FIGS. 1A and 1B are views showing a configuration example of a non-contact IC card which is a component of the non-contact IC card system. FIG. 1A is a transparent perspective view of the non-contact IC card; and FIG. 1B, a sectional view taken along the line 1B-1B in FIG. 1A. The configuration example of the non-contact IC card will be explained with reference to FIGS. 1A and 1B.

A non-contact IC card 100 has a card-like main body 101, an IC device 102 provided in the main body 101, and main antennas 103 connected to the IC device 102.

The main body 101 is a member formed by shaping, into a plate, a material with appropriate strength such as resin or resin-impregnated paper. Although FIGS. 1A and 1B show the main body 101 as one plate-like member formed in one piece, the main body 101 may adopt a laminated structure in which an inlet sheet having an antenna and an IC provided therein is sandwiched between two overlay sheets serving as a front printing side and a back printing side, respectively.

The IC device 102 is an electronic component designed to execute a processing function, a storage function, and an input/output control function and has a function of performing information processing for sending or receiving data to or from a reader (reader/writer).

The IC device 102 has circuitry (e.g., a dual-band IC chip) capable of sending and receiving data both by using electromagnetic waves of a frequency band supported by the main antennas 103 and by using electromagnetic waves of another frequency band supported by sub-antennas 202.

Each main antenna 103 is a device which receives electromagnetic waves emitted from a reader through space and supplies them to the IC device 102 or sends a signal generated by the IC device 102 to the reader through space.

In the example shown in FIGS. 1A and 1B, each main antenna 103 is a so-called dipole antenna and a tabular conductor. As for the main antenna 103, a length is set to a predetermined length (e.g., a half-wavelength) such that the main antenna 103 supports the frequency band (e.g., 2.45 GHz) of carrier waves emitted from a reader.

Each main antenna 103 may be formed by any method. For example, any of a screen printing method, an etching method, and a plating method may be used.

[2. Configuration Example of Attaching Body]

Figure 2:
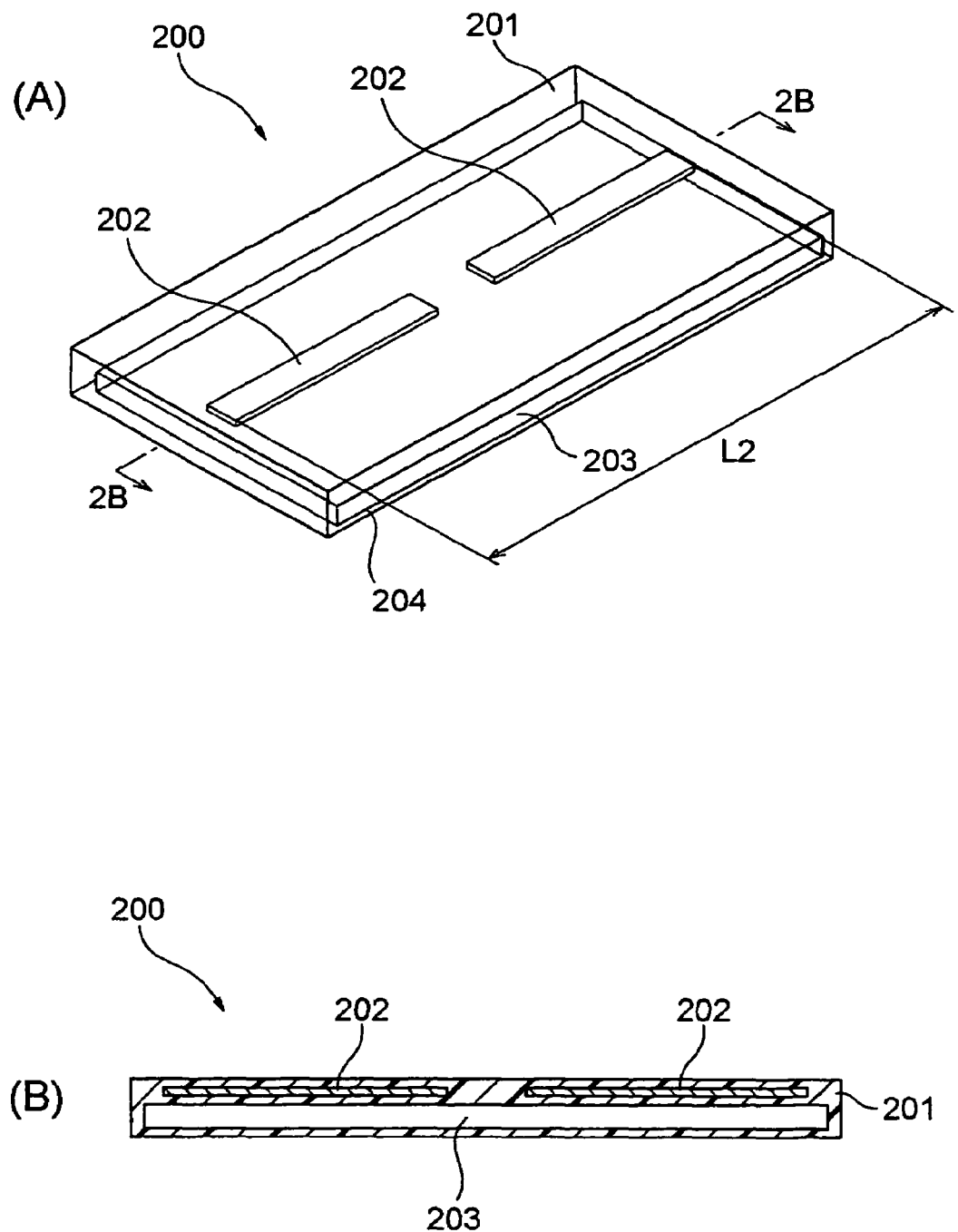
FIG. 2A is a transparent perspective view of an attaching body.
FIG. 2B is a sectional view taken along the line 2B-2B in FIG. 2A.

A configuration example of an attaching body will be explained next with reference to FIGS. 2A and 2B. FIGS. 2A and 2B are views showing a configuration example of the attaching body, which is a component of the non-contact IC card system. FIG. 2A is a transparent perspective view of the attaching body; and FIG. 2B, a sectional view taken along the line 2B-2B in FIG. 2A. The configuration example of the attaching body will be explained below with reference to FIGS. 2A and 2B.

An attaching body 200 according to this embodiment has a case body 201 and the sub-antennas 202 provided in the case body 201. The case body 201 has an accommodation space 203 therein whose volume is large enough to accommodate the card 100 and an opening 204 which connects the accommodation space 203 to the outside. The card 100 is inserted into the accommodation space 203 through the opening 204 and held in the case body 201.

Each sub-antenna 202 is a device which receives electromagnetic waves emitted from a reader (not shown) through space and supplies them to the IC device 102 or sends a signal generated by the IC device 102 to the reader through space.

In the example shown in FIGS. 2A and 2B, each sub-antenna 202 is a so-called dipole antenna and a tabular conductor, like the main antennas 103. As for the sub-antenna 202, a length L2 is set to a predetermined length (e.g., a half-wavelength) such that the sub-antenna 202 supports a frequency band (e.g., 900 MHz) different from the frequency band (e.g., 2.45 GHz) of carrier waves received by the main antennas 103.

Each sub-antenna 202 may be formed by any method. For example, a metal strip which is shaped like a reed in advance may be stuck on or buried in the case body 201 and used as the sub-antenna 202. Alternatively, a conductive film may be formed on the surface of the case body 201 by any of a screen printing method, an etching method, and a plating method and used as the sub-antenna 202.

Each sub-antenna 202 is disposed such that the sub-antenna 202 and the corresponding main antenna 103 at least partially oppose each other when the attaching body 200 is attached to the card 100. With this disposition, the sub-antenna 202 and corresponding main antenna 103 constitute a capacitively-coupled device (capacitor).

Figure 3:
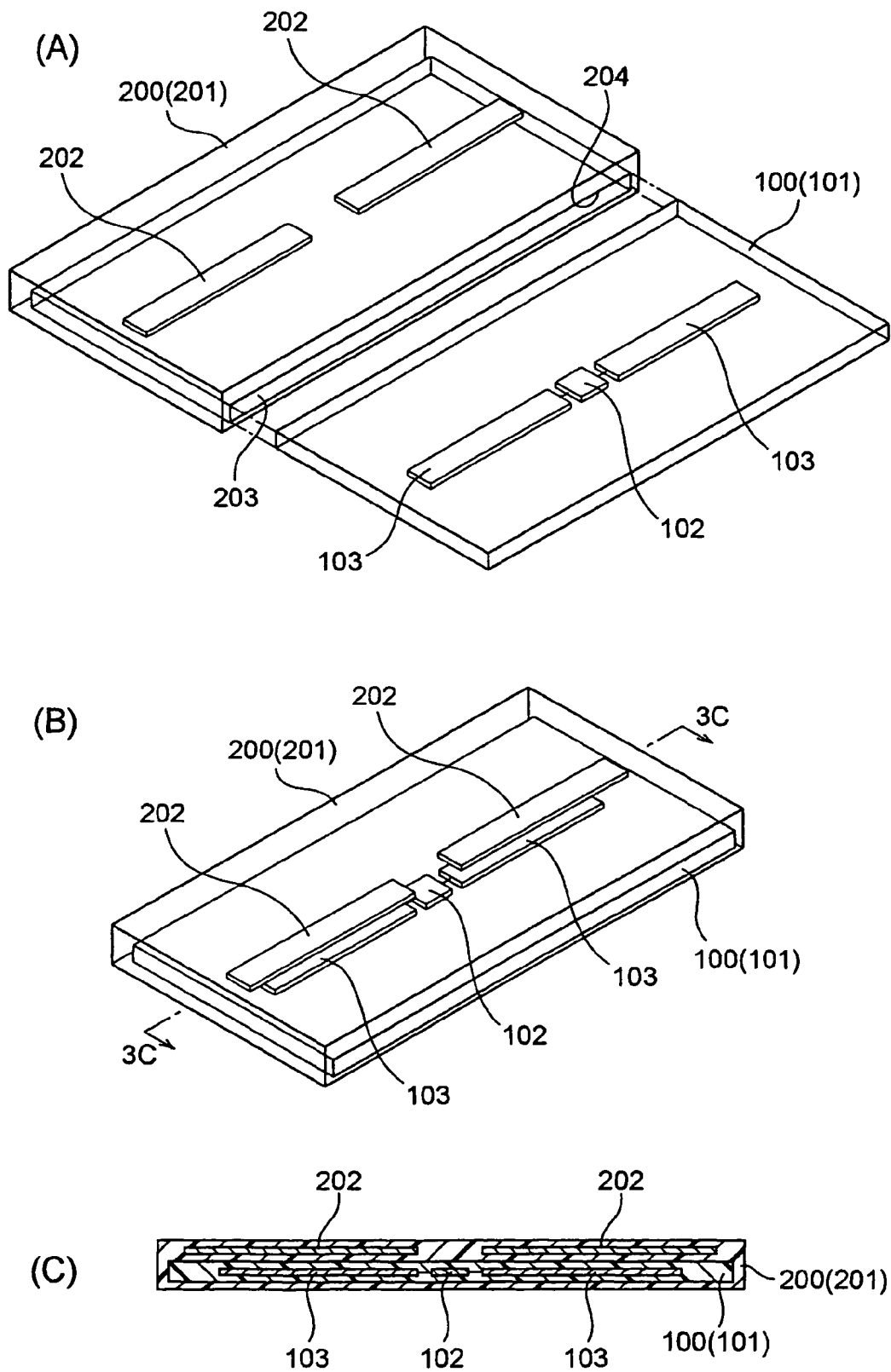
FIG. 3A is a perspective assembly view before the attaching body is attached to the card.
FIG. 3B is a transparent perspective view showing an attached state in which the attaching body is attached to the card.
FIG. 3C is a sectional view taken along the line 3C-3C in FIG. 3B.

FIGS. 3A, 3B, and 3C show an attachment state when the attaching body 200 is attached to the card 100. FIG. 3A is a perspective assembly view before the attaching body 200 is attached to the card 100; FIG. 3B, a transparent perspective view showing an attached state in which the attaching body 200 is attached to the card 100; and FIG. 3C, a sectional view taken along the line 3C-3C in FIG. 3B.

As shown in FIGS. 3B and 3C, in the attached state, the pair of main antennas 103 and the pair of sub-antennas 202 oppose and are spaced apart from each other. Consequently, each main antenna 103 and the corresponding sub-antenna 202 act similarly to the electrode plates of a capacitively-coupled device (capacitor). Electromagnetic waves received by the sub-antenna 202 are supplied from the sub-antenna 202 to the IC device 102 through the main antenna 103.

With the above-described configuration, according to the system, when the attaching body 200 is not attached to the card 100, electromagnetic waves of a frequency band supported by the main antennas 103 are supplied from the main antennas 103 to the IC device 102. On the other hand, when the attaching body 200 is attached to the card 100, electromagnetic waves of a frequency band supported by the sub-antennas 202 are supplied to the IC device 102 through the sub-antennas 202 and main antennas 103.

[3. Another Configuration Example of Attaching Body]

Figure 4:
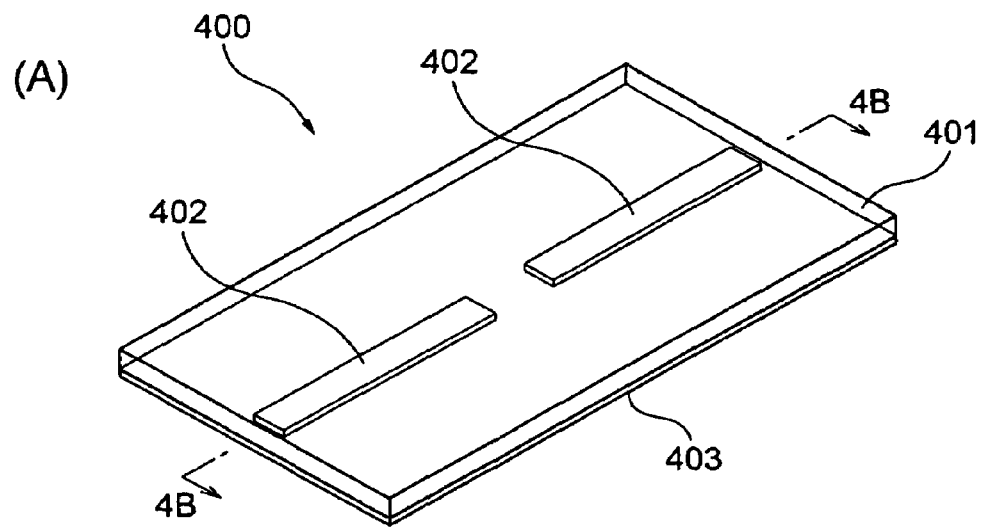
FIG. 4A is a transparent perspective view of another attaching body.
FIG. 4B is a sectional view taken along the line 4B-4B in FIG. 4A.
Figure 4:
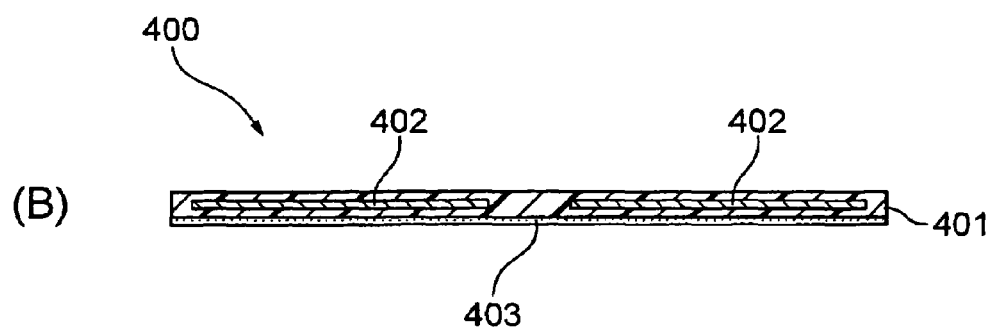

Another configuration example of an attaching body will be explained next with reference to FIGS. 4A and 4B. FIGS. 4A and 4B are views showing another configuration example of the attaching body, which is a component of the non-contact IC card system. FIG. 4A is a transparent perspective view of the attaching body; and FIG. 4B, a sectional view taken along the line 4B-4B in FIG. 4A. The other configuration example of the attaching body will be explained below with reference to FIGS. 4A and 4B.

An attaching body 400 as the configuration example is a plate-like (card-like) member to be attached to one side of the card 100. The attaching body 400 has a card-like plate 401 which is made of a material with appropriate strength such as resin, sub-antennas 402 provided in the plate 401, and an adhesion layer 403 provided on one side of the plate 401. The plate 401 is a member formed by shaping into a plate, a material with appropriate strength such as resin or resin-impregnated paper.

The attaching body 400 can be easily attached to the card 100 by pressing the adhesion layer 403 against the card 100. The use of an adhesive agent which is reusable as the adhesion layer 403 makes it possible to reattach to the card 100, the attaching body 400 having been removed from the card 100 by pressure-bonding the attaching body 400 to the card 100 again.

Figure 5:
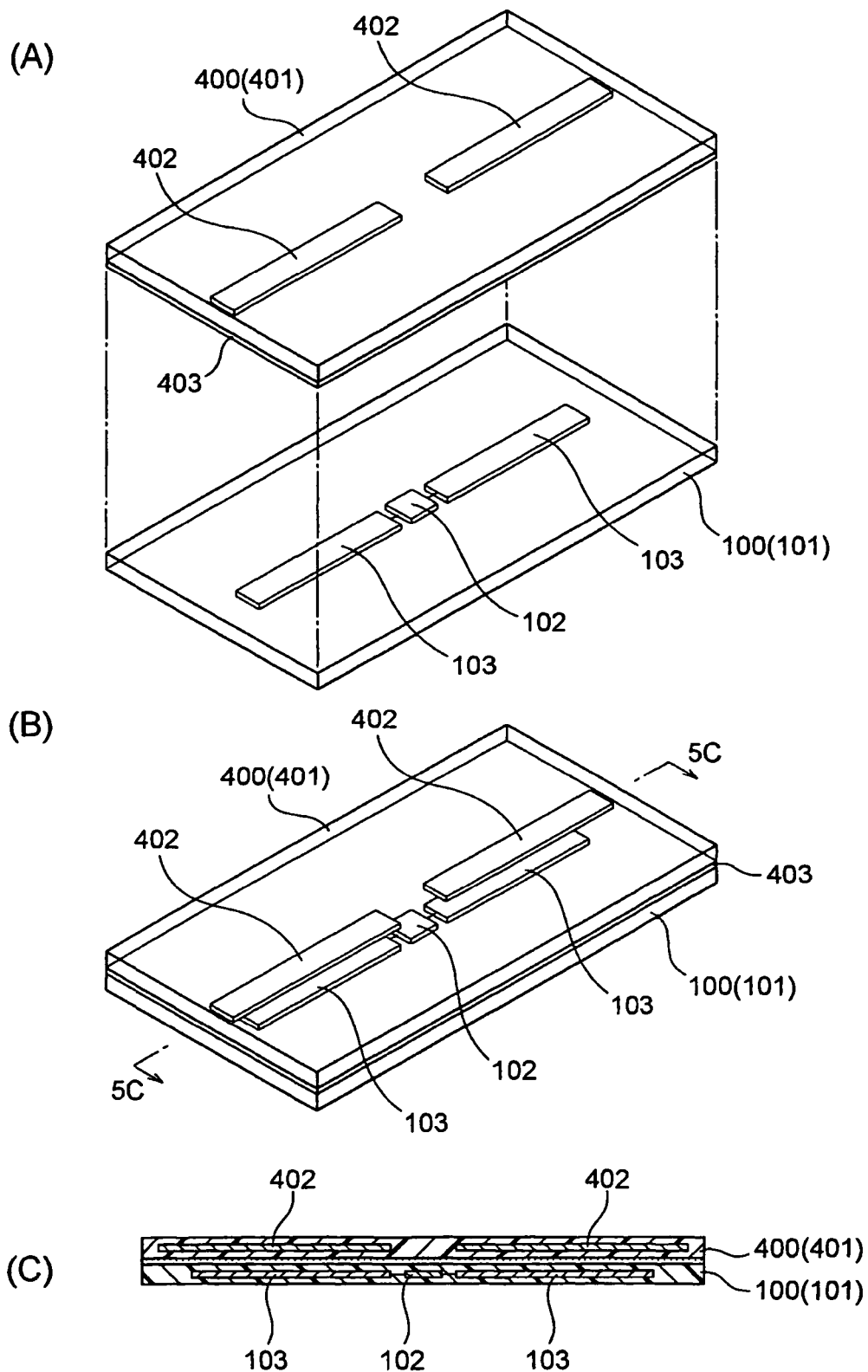
FIG. 5A is a perspective assembly view before the other attaching body is attached to the card.
FIG. 5B is a transparent perspective view showing an attached state in which the attaching body is attached to the card.
FIG. 5C is a sectional view taken along the line 5C-5C in FIG. 5B.

FIGS. 5A, 5B, and 5C show an attachment state when the attaching body 400 is attached to the card 100. FIG. 5A is a perspective assembly view before the attaching body 400 is attached to the card 100; FIG. 5B, a transparent perspective view showing an attached state in which the attaching body 400 is attached to the card 100; and FIG. 5C, a sectional view taken along the line 5C-5C in FIG. 5B.

As shown in FIGS. 5B and 5C, in the attached state, the pair of main antennas 103 and the pair of sub-antennas 402 oppose and are spaced apart from each other. Consequently, each main antenna 103 and the corresponding sub-antenna 402 act similarly to the electrode plates of a capacitively-coupled device (capacitor). Electromagnetic waves received by the sub-antenna 402 are supplied from the sub-antenna 402 to the IC device 102 through the main antenna 103.

[4. Electrical Configuration of the System]

Figure 6:
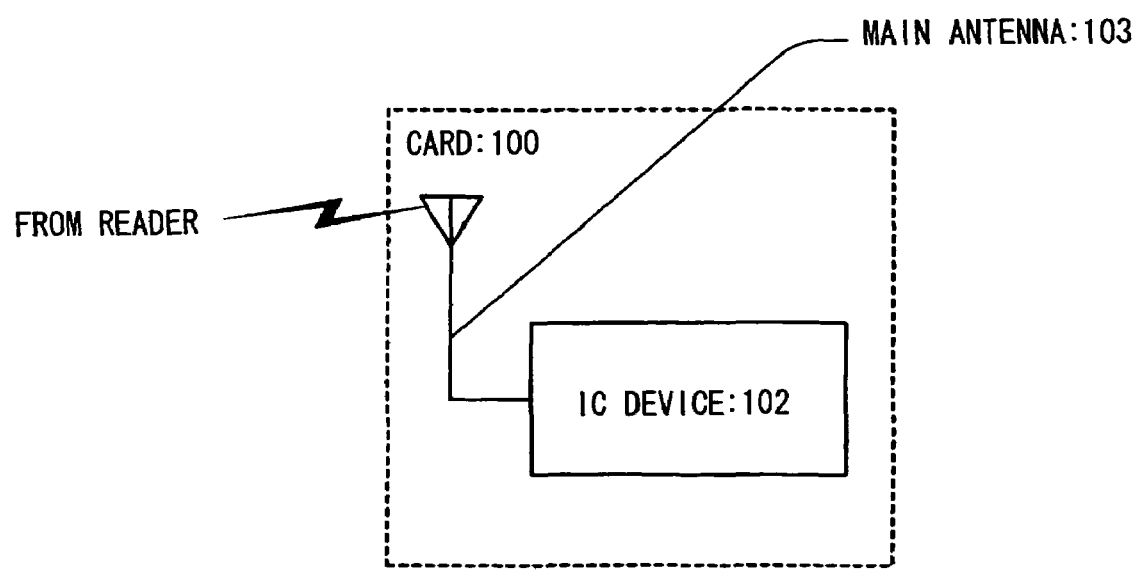
FIG. 6 is a block diagram of a state before the attaching body is attached.
Figure 7:
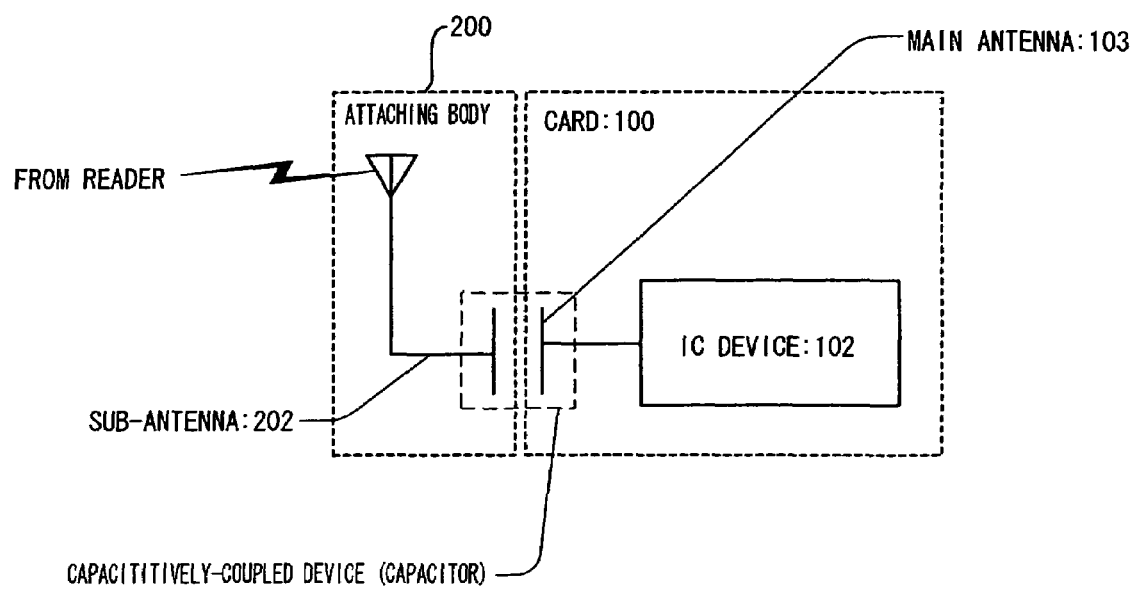
FIG. 7 is a block diagram of a state in which the attaching body is attached.

An electrical configuration example of the system will be explained next. FIGS. 6 and 7 are block diagrams showing electrical configuration examples of the system. FIG. 6 is a block diagram of a state before the attaching body is attached; and FIG. 7, a block diagram of a state in which the attaching body is attached. FIGS. 6 and 7 each show, as an attaching body to be used, the attaching body 200 shown in FIGS. 2A, 2B, 3A, 3B, and 3C. However, the system has the same electrical configuration even if the attaching body 400 is used instead.

As shown in FIG. 6, in the state before the attaching body 200 is attached, the main antennas 103 of the card 100 absorb electromagnetic waves of a frequency band (the resonant frequency of the main antennas 103) supported by the main antennas 103 and supply them to the IC device 102. Accordingly, a reader (not shown) can communicate with the card 100 if it emits electromagnetic waves of a frequency band supported by the main antennas 103.

In the state shown in FIG. 7 after the attaching body 200 is attached, the sub-antennas 202 of the attaching body 200 absorb electromagnetic waves of a frequency band (the resonant frequency of the sub-antennas 202) supported by the sub-antennas 202 and supply them to the IC device 102. At this time, each sub-antenna 202 and the corresponding main antenna 103 function as a capacitively-coupled device (capacitor). For this reason, electromagnetic waves received by the sub-antenna 202 are supplied to the IC device 102 through the coupled device. That is, in the state in which the attaching body 200 is attached, the reader (not shown) can communicate with the card 100 when the reader is emitting electromagnetic waves of the frequency band supported by the sub-antennas 202 which is different from the frequency band supported by the main antennas 103.

As described above, in the system, the attaching body 200 (the same applies to the attaching body 400) is attached and detached. This makes it possible to build a non-contact IC card system adaptable to electromagnetic waves emitted by the reader even if the electromagnetic waves are in a plurality of different frequency bands.

[5. Other Configuration Examples]

(1) By preparing, in the system, a plurality of attaching bodies which support respective different frequency bands, there can also be provided a non-contact IC card system which makes one non-contact IC card adaptable to three or more different frequency bands (e.g., 950 MHz in Japan, 880 MHz in Europe, and 915 MHz in the US).

(2) As a method of attaching an attaching body to the card 100, any method other than that of the above-described embodiment may be used as far as the attaching body is detachable. For example, a method of integrally forming respective engaging portions (e.g., an engaging projection and a receiving recess) in the attaching body and card 100 may be used. The present invention is also realized by a method of attaching the attaching body to the card 100 with a utensil for attachment (e.g., a belt or fastener).

(3) The above-described embodiment has shown a case where linear dipole antennas are used as examples of main antennas and sub-antennas. The present invention, however, is not necessarily intended to be limited to a configuration in which main antennas and sub-antennas are linear.

Figure 8:
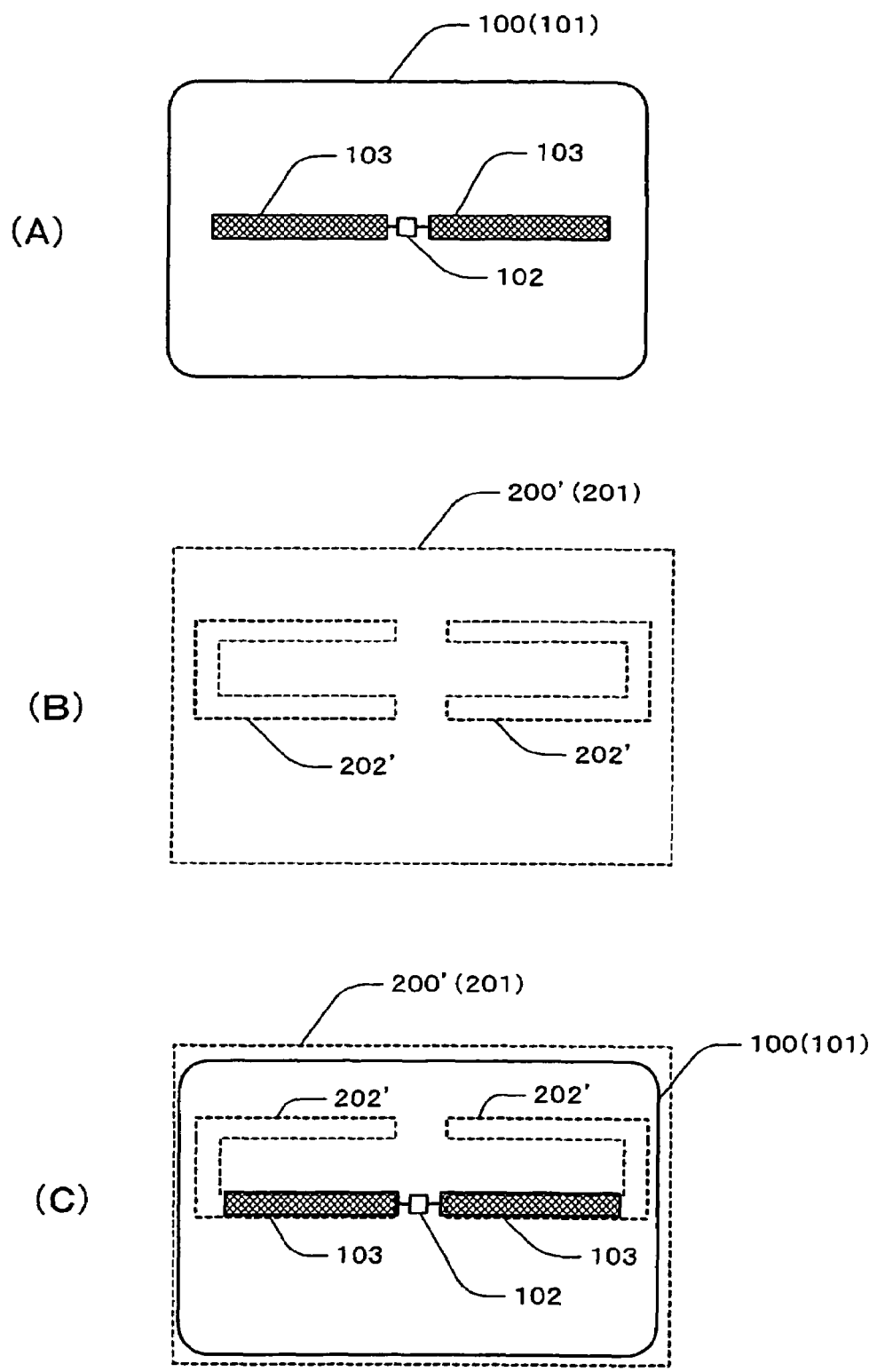
FIG. 8A is a transparent plan view of the non-contact IC card.
FIG. 8B is a transparent plan view of an attaching body.
FIG. 8C is a transparent plan view of a state in which the attaching body is attached to the non-contact IC card.

FIGS. 8A, 8B, and 8C show an example of a non-contact IC card system which uses an attaching body with U-shaped sub-antennas, as an example of a case where non-linear antennas are adopted. FIG. 8A is a transparent plan view of the non-contact IC card 100; FIG. 8B, a transparent plan view of an attaching body 200'; and FIG. 8C, a transparent plan view of a state in which the attaching body 200' is attached to the non-contact IC card 100.

In the example shown in FIGS. 8A and 8C, the non-contact IC card 100 is the same as that shown in FIGS. 1A, 1B, 3A, 3B, and 3C, and a detailed explanation thereof will be omitted. The attaching body 200' is the same as the attaching body 200 shown in FIGS. 2A, 2B, 3A, 3B, and 3C except that its sub-antennas have a shape different from that of the sub-antennas 202. The attaching body 200' has U-shaped sub-antennas 202' provided therein. The adoption of the sub-antennas 202' with this shape makes it possible to provide, in the attaching body 200', an antenna supporting a frequency band with long wavelengths.

When the attaching body 200' is attached to the non-contact IC card 100, a part (lower shaded portion in FIG. 8C) of each sub-antenna 202' is arranged to oppose the corresponding main antenna 103, as shown in FIG. 8C. Opposing portions of the antenna 103 and corresponding antenna 202' function as a capacitively-coupled device. The sub-antennas 202' absorb electromagnetic waves of a frequency band which they support and supply the received electromagnetic waves from the main antennas 103 to the IC device 102 through the portions functioning as the capacitively-coupled devices.

Note that the shapes of the main antennas 103 and sub-antennas 202', of course, are not limited to a U-shape as described above and that any other shape may be adopted.

(5) The distance between the main antennas 103 and the sub-antennas 202 or 402 is preferably as short as possible to minimize power loss.

The present invention is not limited to an IC card, an IC tag, and the like and can be applied to all apparatuses using a non-contact communication method.

[6. Advantages of the Invention]

According to the present invention, it is possible for a non-contact IC card to accept a frequency band different from a first frequency band that is the main receive frequency band of the non-contact IC card, by attaching an attaching body.

Additional advantages and modifications will readily occur to those skilled in the art. Therefore, the invention in its broader aspects is not limited to the specific details or representative embodiments shown and described herein. Accordingly, various modification may be made without departing from the spirit or scope of the general inventive concept as defined by the appended claims and their equivalents.

What is claimed is:

1. A non-contact IC card system comprising:
    a non-IC card including
        an electrically insulating body,
        a first antenna comprising a first plate shape conductor, the first antenna supporting a first frequency band, and
        an IC device connected to the first antenna for data transmission and reception; and
    an electrically insulating attaching body including a second antenna comprising a second plate shape conductor, the second antenna supporting a second frequency band, different from the first frequency band, and detachably attached to the IC card, wherein
        the first antenna and the second antenna are opposed to each other and spaced apart from each other when the attaching body is attached to the IC card so that the first and second antennas are capacitively coupled to each other through parts of at least one of the insulating body of the IC card and the insulating attaching body that are interposed between the first and second plate shape conductors, and
        when the attaching body is attached to the IC card and the second antenna receives electromagnetic waves, the IC device is driven by the electromagnetic waves through the capacitive coupling of the second antenna to the first antenna.

2. The non-contact IC card system according to claim 1, wherein the attaching body includes an internal volume for accommodating the IC card and an opening through which the IC card may be inserted into the internal volume so that the first and second antennas are opposed to each other and capacitively coupled to each other through parts of at least one of the insulating body and the insulating attaching body.

3. The non-contact IC card according to claim 1, wherein the attaching body has a plate shape that is substantially the same shape and area as the IC card, and that contains the second antenna, for attachment to a surface of the IC card.

\* \* \* \* \*